Nov. 15, 1949  C. P. BERGMAN  2,487,783
MAGNETIC DRIVE

Filed Sept. 20, 1944  2 Sheets-Sheet 1

INVENTOR.
CHARLES P. BERGMAN
BY
Strauch & Hoffman
ATTORNEYS

Nov. 15, 1949  C. P. BERGMAN  2,487,783
MAGNETIC DRIVE

Filed Sept. 20, 1944  2 Sheets-Sheet 2

INVENTOR.
CHARLES P. BERGMAN
BY
Strauch & Hoffman
ATTORNEYS

Patented Nov. 15, 1949

2,487,783

UNITED STATES PATENT OFFICE 2,487,783

MAGNETIC DRIVE

Charles P. Bergman, Brooklyn, N. Y.; William V. Elliott, administrator of said Charles P. Bergman, deceased, assignor to Rockwell Manufacturing Company, Pittsburgh, Pa., a corporation of Pennsylvania Application September 20, 1944, Serial No. 554,985

12 Claims. (Cl. 73—257)

This invention relates to magnetic driving means as for fluid meter registers and the like in which the registering or like mechanism is more or less directly associated with the meter or other actuating device and operating power is transmitted thereto from an element movable in response to a change in condition, such as a fluid actuated meter piston within a measuring chamber.

Magnetic driving means has long been recognized in the meter art as a very desirable type of power transmission for translating the movements of a meter piston by means of registering mechanism into terms of measured quantities of liquid flowing through the measuring chamber of the meter. Many attempts have been made to perfect such a magnetic drive, but they have invariably proved to be unsatisfactory from the practical standpoint.

Of the many faults inherent in these prior efforts lack of sufficient driving power to overcome frictional resistance in the registering mechanism is a common characteristic. Also, when the meter was operated at a high rate of flow, a reversal of polarity of the driving and driven magnets would usually occur resulting in the complete disruption of transmission of motion to the registering mechanism, which could not be rectified until the meter was slowed down or brought to a complete stop. Further, such prior magnetic drive designs, due to the form and arrangement of the driving and driven magnets were quite expensive and the driven magnet usually exerted a retarding thrust upon the register driving shaft due to magnetic pull, and as the magnets were inadequately protected against the corrosive effects of moisture from the measuring chamber, maintenance costs were high.

It is a major object of the invention to provide a novel continuously coupled magnetic drive for meters and the like which is maintained at all normal driving speeds.

It is further an important object of the present invention to provide a novel construction and arrangement of a magnet and associated magnetically coupled drive member associated with a movable meter element and a register shaft whereby the above defects of previous atttempts to solve this problem will be eliminated.

A further object of the invention is to provide a novel magnetic drive assembly for insuring accurate alignment of register or like driven elements.

A further object of the invention is to provide a novel magnetic drive wherein a pair of physically separated magnetically coupled drive and driven members, at least one of which is a magnet, constitute a motion transmitting connection wherein the driven member undergoes substantially only rolling movement whereby friction and inertia are minimized during operation. Pursuant to this object either both members may be made magnets where high attractive forces are required, or only one of the members need be a magnet with the other being a magnetically attractive part.

It is another object of the invention to provide a magnetic drive wherein magnetically coupled drive and driven elements, comprising a bar magnet and a ferrous or like magnetically attractive bar, are arranged in a novel relation which obviates the necessity of considering polarity in the assembly of the drive elements in order to transmit maximum power to the registering mechanism at different rates of fluid flow. The ferrous bar may be made hollow to reduce inertia and compensate for the lack of attraction which would have been available with two magnets.

Another object of my invention is to provide a magnetic drive having physically separate hermetically sealed magnetically coupled driving and driven members so that they will be indefinitely protected against corrosion.

A further object of the invention is to provide a cooperative arrangement of driving and driven members whereby angular radial thrust by the driven member under magnetic pull against a register driving shaft or the like is rendered impossible.

A still further object of the invention is to provide a magnetic drive means for meter registers, in which the register and reducing gear train may be constructed of light and inexpensive materials, completely enclosed and hermetically sealed exteriorly of the measuring chamber to protect the same against corrosion and preclude condensation forming on the register glass which obstructs the reading of the register dial.

It is a further object of the invention to provide a novel anti-friction bearing arrangement for a magnetic drive system wherein bearings of nylon or like material are employed.

My invention has for another of its objects, in one embodiment thereof, to provide a stationary armature member associated with the driving magnet in order to obtain magnetic balance of the meter piston and support the same substantially in a position of floating equilibrium in the measuring chamber and out of frictional contact with the walls thereof.

In general, it is the aim and purpose of the preferred embodiment of the present invention to provide a magnetic driving means for fluid meter registers which embodies a simple, compact and durable assembly of the several elements, mounted and arranged relative to the meter piston and registering mechanism, whereby attempts to demagnetize said driving means and prevent the proper operation of the registering mechanism will be frustrated.

With the above and other subordinate objects in view, the preferred embodiment of the invention comprises an improved magnetic driving means for fluid meter registers and the construction and relative arrangement of its several parts, as will hereinafter be more fully described, illustrated in the accompanying drawings and subsequently incorporated in the subjoined claims. It will be understood, however, that the scope of the invention is not limited to fluid flow meters as will appear from the scope of the claims herein.

In the drawing, wherein I have disclosed several simple and practical embodiments of my invention, and in which similar reference characters designate corresponding parts throughout the several views.

Figure 1:
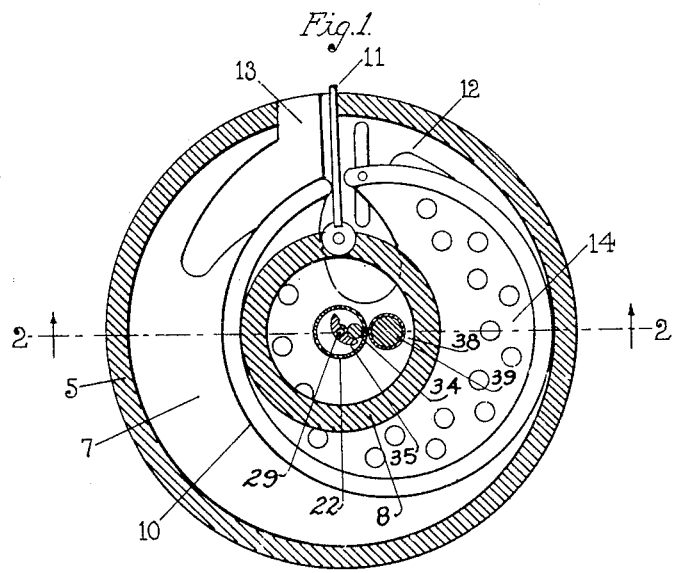
Figure 1 is a horizontal sectional view through the fluid meter taken substantially on the line 1—1 of Figure 2.

Referring in greater detail to the drawing, for purposes of illustration I have shown the novel features of my present disclosure as applied to a fluid meter of the oscillating piston type, such for instance as that shown in the United States patent of Alexander R. Whittaker No. 2,338,152 issued January 4, 1944.

As shown in said patent, the meter includes upper and lower complementary internal housing sections 5 and 6, respectively, which are of non-magnetic metal such as bronze and together form the measuring chamber 7. The enclosing meter casing is not shown in Figure 1. Each of sections 5 and 6 is centrally formed with an internal hollow boss, 8 and 9 respectively, the wall of which is concentrically related to the outer cylindrical wall of the chamber section. Within the measuring chamber 7 a fluid actuated oscillatory piston 10 of molded plastic such as Bakelite or some light non-magnetic metal such as magnesium is arranged in cooperative relation with the radially disposed baffle or division plate 11 extending across the measuring chamber between the inlet and outlet ports 12 and 13 respectively. Plate 11 is preferably brass or some material which resists corrosion and is non-magnetic.

A central balancing web 14 is integrally formed with the annular vertical wall of an oscillating piston 10 and is freely movable between the opposed ends of the bosses 8 and 9 of the measuring chamber sections in the oscillating motion of the piston.

Since the construction and functional operation of this type of fluid meter is fully described in the patent above referred to, further detailed description thereof is not required for an understanding of my present invention.

The wall of the boss 8 has an end portion 15 of reduced external diameter projecting above the measuring chamber and extending within a central downwardly opening circular cavity 17 in the bottom wall of a non-metallic housing 16 within which the meter register 18 and the reducing gear train 19 is enclosed. The part 15 of the measuring chamber may have snug fit with the circumferential wall of the cavity 17.

Centrally of the cavity 17 an opening 20 is formed through the bottom wall of the housing 16 to receive a sleeve 21 with which a thin walled cylindrical tube 22 having a closed bottom so as to provide a well is integrally formed and extends downwardly within the boss 8 to a point adjacent the web 14 of the piston 10.

At the juncture of the tube or well 22 with the sleeve 21 the latter is formed with an outwardly extending annular flange 23 and a flexible packing ring 24 is interposed between the upper face of this flange and the base wall of the cavity 17. The sleeve 21 extends above the bottom wall of the housing 16 and is externally threaded as at 25 for engagement with the threaded wall of a central opening in a non-magnetic base plate 26 upon which the reducing gear train 19 is mounted, so that plate 26 serves as a nut for securing tube 22 to housing 16 and packing 24 makes the connection fluid tight.

Sleeve 21 at its upper end is also internally threaded to receive an externally threaded brass bushing 27 in which the bearing member 28 for the gear train driving shaft 29 of non-magnetic material is secured and seated. Bearing member 28 is preferably made of the plastic known as nylon which has good lubricating qualities in such bearings.

The lower end of the shaft 29 has a further bearing in the disk 30 seated upon the lower end wall 31 of the tube 22. Disk 30 is of the same material as member 28. Above the bearing 28, shaft 29 carries a pinion 32 in mesh with one of the elements of the gear train 19. A collar or washer 33, preferably of molded nylon like bearing member 28, is fixed to shaft 29 adjacent the lower face of the bushing 27 to prevent undesired upward axial movement of the driving shaft.

Within tube or well 22, a driven member 34 which in the preferred embodiment is a bar magnet is contained and hermetically sealed by said tube from the measuring chamber 7 of the meter. Preferably, magnet 34 is in the form of a cylindrical roller formed from soft iron or steel or other magnetic material. To the driving shaft 29 a horizontally disposed laterally arcuate arm 35 is suitably fixed. Arm 35 is also preferably of nylon like bearing member 28. The magnet 34 is of such diameter relative to the internal diameter of tube 22 and shaft 29 that magnet 34 is at all times in rolling contact with the cylindrical inner surface of tube 22 and the concave face of the arm 35 to continuously drive the shaft 29 in one direction in the functioning of the device in the manner to be later explained.

Figure 2:
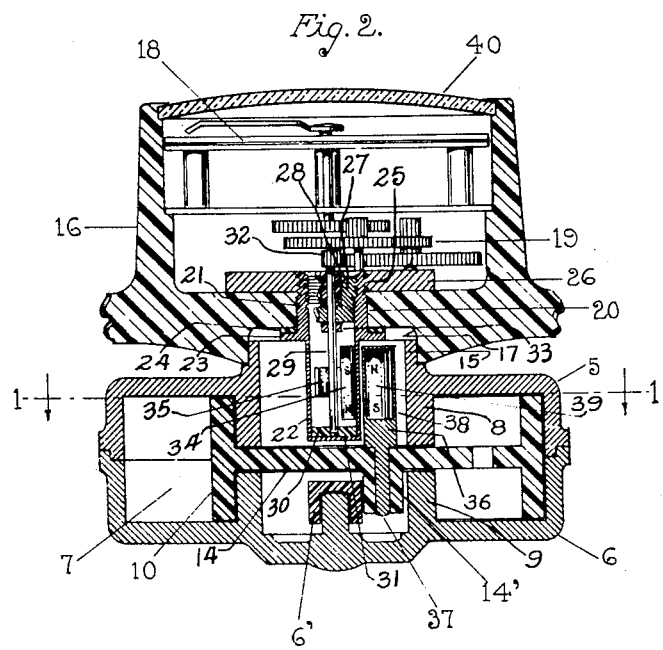
Figure 2 is a vertical sectional view taken substantially on the line 2—2 of Figure 1.

The lower reduced end 37 of a post 36 is rigidly fixed within a cylindrical boss 14' integral with the web 14 of piston 10 at approximately its axial center. Post 36 moves with said piston in its oscillating movement around the tube 22. During such movement, boss 14' engages free guide roller 6'. Post 36 has a thin walled hollow cylindrical upper section 38 closed at its upper end and hermetically sealing a driving bar magnet 39 therein from the measuring chamber 7 of the meter. This driving magnet is of cylindrical bar form so as to occupy nearly all the space within section 38 and of a length approximately equal to the length of the driven magnet 34 and is held parallel to the axis of rotation of shaft 29. As illustrated in Figure 2, the polarities of magnets 34 and 39 are reversed for maximum attraction.

The post 36 is preferably formed from a suitable non-magnetic material while the tube 22 is preferably of stainless steel, and both post 36 and tube 22 are resistant to corrosion by the fluid passing through the meter. It will be noted that the post 36 and tube 22 are in very closely adjacent parallel but spaced relation to each other so that by reason of the thin wall thickness of said post and sleeve there will be a very powerful attractive influence by the vertically erect driving magnet 39, as it moves with the oscillating piston, upon the free driven magnet 34 to hold the latter in vertically erect intimate rolling substantially frictionless contact with the endless cylindrical inner surface of tube 22, counter-acting the effects of friction and inertia and effectively preventing inward radial thrust by the member 34 against the register driving shaft 29. If desired, the post 36 may be made of solid magnetic material and serve as a bar magnet so that use of the separate magnet 39 may be dispensed with, in which case a suitable corrosion inhibiting coating should be applied to said post.

It will be evident from the above description that the driving and driven magnets will always remain in substantially the same parallel axial relationship and the lines of magnetic force will not be attenuated or interrupted in the transmission of motion and power from the piston 10 to the driving shaft 29, as is the case in some prior meters where two magnets of the bar type are mounted to rotate about a common axis.

As the magnet 39 moves in a circular path about the axis of shaft 29 in the movement of piston 10 around the tube 22, it exerts a powerful magnetic pull on driven magnet 34 causing the latter to travel in a concentric path with the magnet 39 and in rolling contact with the cylindrical inner face of the tube 22 and in constant driving contact with arm 35 on register shaft 29. Thus frictional resistance in the registering mechanism will be effectively overcome, and the movement of the piston 10 will be smoothly and positively transmitted without interruption to the register 18 to give an accurate reading in terms of volume or quantity of the liquid delivered through the meter.

The relative arrangement of the members 34 and 39 as above described is well adapted for the use of a magnet bar for each of said members as such arrangement assures a constant proper polar relationship of said members and obviates the possibility of a reversal of polarity of the magnetic field in the higher range of operating speeds.

Since it is usually only necessary to obtain sufficient power from the meter piston to operate the light register mechanism with a reasonable safety factor, it has been found that excellent results may be obtained by using only one magnet, either at 34 or 39. This may be done by substituting for either one of magnets 34 or 39 a solid or hollow roller of steel, soft iron or other ferrous or magnetic material. The light weight and low inertia of a thin walled hollow roller especially renders it readily attracted to the associated bar magnet.

The attractive influence of the magnet for the associated roller or other magnet may, to a certain extent, be predetermined and controlled by variation of the bore diameter of such a hollow roller since its attraction to the associated parallel magnet is a function of its wall thickness.

By using only one bar magnet, many advantages are obtained which may be taken advantage of when the high magnetic coupling of two magnets is not necessary. It becomes unnecessary to consider the question of polarity in assembling the driving and driven members; where member 39 is the only magnet the sealed register mechanism will not be appreciably affected by magnetic influences; and a ferrous roller is easier to machine than a rod or bar magnet so that an appreciable reduction in production cost will be realized.

The upper end of the housing 16 is closed by means of a cover 40 of glass or other transparent material extending over the register 18. Since this register and the reducing gear train 19 are hermetically sealed within the housing externally of the meter case, they are protected against the corrosive effects of moisture from the measuring chamber 7 and vapor condensation upon the inner face of the cover 40, which would interfere with the reading of the meter dial.

The meter piston 10 and the housing 16 are preferably molded from "Bakelite" or other composition material with a view to preventing possible disturbance of the magnetic flux field by internally developed eddy currents. The meter casing and base plate 26 are preferably of bronze or other non-magnetic material.

Figure 3:
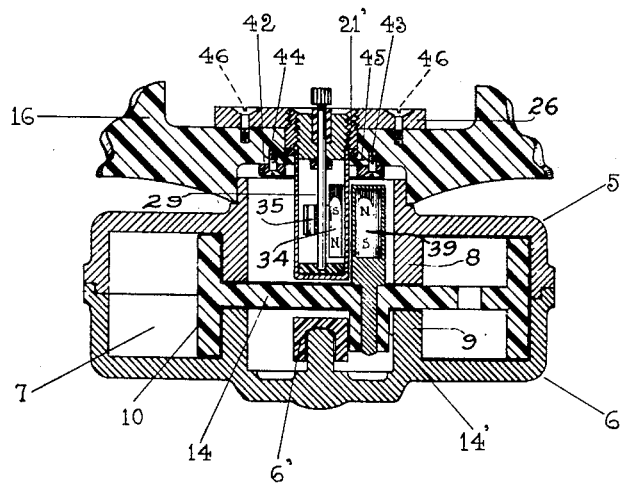
Figure 3 is a vertical sectional view similar to Figure 2 showing a slightly modified form of the invention.

In Figure 3 of the drawings I have shown an embodiment of my invention which is substantially the same as that above described, with the addition of the soft iron armature ring 42 secured to the base of the cavity 17 in the wall of the housing 16 by means of suitable screws, as indicated at 43. This armature ring is opposed to the upper end of the hollow post section 38 in which magnet 39 is contained and, in the operation of the meter, exerts a sufficient upward anti-gravity pull through said post to sustain the piston 10 substantially in a position of floating equilibrium within the fluid in chamber 7 and out of contact with the top and bottom walls of the measuring chamber and the end surfaces of the bosses 8 and 9. Thus mechanical frictional resistance to the free oscillatory motion of the piston is obviated, further increasing the accuracy of operation of the register 18. The armature 42 also acts to maintain the driving magnet 39 in a constant axial position relative to the driven member 34 so that the driving force of the magnetic flux field will be substantially uniformly constant.

In this modified construction, the sleeve 21' is relatively short and is seated at its lower end upon the packing ring or gasket 44 arranged on the shoulder 45 formed by counter-boring the upper end of the opening through the bottom wall of the housing 16. Well 22 is suitably rigidly secured to sleeve 21'. The base plate 26 is secured to the bottom wall of the housing by screws indicated at 46. The armature 42 cooperating with a magnet carried by the meter piston is not herein claimed per se, since it forms the subject matter of an application for patent filed by Charles P. Bergman on July 17, 1944, Serial No. 545,237, which matured into Patent Number 2,449,973 on September 28, 1948.

The bearing elements 28, 30 and 33 and the shaft driving arm 35 are preferably formed from a tough, abrasion-resistant material having a very low coefficient of friction, so that power losses will be reduced to a minimum and highly accurate and reliable operation of the register 18 obtained. For this purpose I have obtained excellent results from the use of "nylon" which is well adapted for the formation of parts of small cross section, such as are required in this instance, under high pressures. This is of particular importance with respect to the arm 35 since frictional resistance to the rotation of the driven roller 34 about its own axis as it drives said arm would appreciably lessen the efficient operation of the device.

The novel register shaft mounting and register drive gear support on plate 26 cooperate to insure concentricity and proper association of the parts during assembly. Bushing member 27 for drive shaft 29 is concentric with base plate 26 which may contain fixed pins or the like for locating the register drive gears in proper association with the pinion 32 on shaft 29.

The above described magnetic coupling, if desired, may be employed in any other suitable apparatus where equivalent motion transmission is desired, and the driven member may be employed to actuate not only a register or other indicator but any control device.

From the above description and the accompanying drawing, the construction, manner of operation and numerous advantages of my present invention will be clearly understood. It will be seen that I have devised a magnetic drive for meter registers in which the faults of previous attempts to solve this problem, as above noted, have been successfully avoided. At the same time, my invention fulfills the practical requirements of simplicity, low production costs, reliable and efficient functional operation at all rates of fluid flow, and very low maintenance expense. Of course, the form and manner of assembly of the meter and register housing as shown in the accompanying drawing is merely suggestive and, in the embodiment of the present invention in meters of various different sizes, applicable to a variety of purposes, these parts may be otherwise constructed and assembled in cooperative relation with each other.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a magnetic drive, means defining an internally cylindrical surface, a first magnetic coupling member outside said cylindrical surface and movable in a path concentric with said surface, and a second magnetic coupling member comprising a cylindrical roller inwardly of said cylindrical surface and adapted for movement in rolling contact therewith in a path concentric with the path of movement of said first member, at least one of said coupling members being a magnet and the other being such as to be attracted thereto.

2. A magnetic drive comprising a first element adapted to be moved in a circular path and a laterally displaced free second element mounted for rolling movement in a circular path spaced from and concentric with said first path, said elements being magnetically attracted to each other so that movement of said first element in its path causes the second element to follow.

3. In the magnetic drive defined in claim 2, a fluid tight seal between said elements.

4. In a magnetic drive, a first member mounted for movement in a circular path, a tubular well having a cylindrical internal surface, and a roller member within said well, one of said members being a magnet and the other being attracted thereto so that movement of said first member in said circular path causes rolling of roller member in a concentric path on said surface.

5. In a magnetic drive, means defining a cylindrical guide surface, a first magnetic coupling member disposed radially inwardly of said surface, a second magnetic coupling member disposed radially outwardly of said surface, one of said members being movable in a path concentric with said surface and the other of said members comprising a cylindrical roller adapted for movement in rolling contact with said surface in a path concentric with the path of movement of said one member, and at least one of said members being a magnet and the other being such as to be attracted thereto.

6. The magnetic drive as defined in claim 5, wherein said one magnetic coupling member is a bar magnet and the other is a substantially longitudinally coextensive bar.

7. In a magnetic drive for transmitting motion from a driving part to a rotatable driven part which are separated by a liquid tight seal, said driving part being movable in a circuit path; a member defining a substantially endless guide surface on one side of said seal, a roller element adapted to roll freely along said surface and to be operatively coupled to said driven part, and a second element disposed adjacent said first element but on the other side of said surface defining member therefrom movable with said driving part, and one of said elements being a magnet and the other magnetically attracted thereto so that movement of said driving part is translated into controlled rolling of said roller element along said surface.

8. In a magnetic drive, means defining a substantially endless guide surface, a first magnetic coupling member disposed on one side of said means, a movably mounted second magnetic coupling member disposed on the other side of said means, one of said members being movable in a predetermined circular path and the other being a roller adapted for movement in free rolling contact with said surface in a circular path following movement of said one member, and at least one of said members being a magnet and the other being such as to be attracted thereto.

9. In a magnetic drive having a drive part and a rotatable driven part separated by a liquid tight seal, said drive part being movable in a circular path, a hollow thin-walled tube defining an endless cylindrical guide surface, a roller element adapted to roll freely along said surface operatively coupled to said driven part, and a second element disposed on the opposite side of said tube from said roller element movable in a circular path determined by said drive part, one of said elements being a magnet and the other being magnetically attracted thereto.

10. In the magnetic drive defined in claim 9, said elements both being bar magnets with reversely disposed polarity for maximum mutual attraction.

11. In a magnetic drive for a meter having a drive part movable in a circular path and a rotatable driven shaft separated therefrom by a liquid tight seal which comprises a hollow thin-walled tube defining an endless cylindrical guide surface, a roller element adapted to roll freely along said surface, a radially extending arm of non-metallic plastic material having a low coefficient of friction rigid with said shaft and formed with a surface interfitting with the roller periphery for driving engagement therewith, and a second element disposed on the opposite side of said tube from said roller element movable in a circular path determined by said driving part, one of said elements being a magnet and the other being magnetically attracted thereto.

12. In combination with a fluid meter having a measuring chamber, an oscillatory piston therein and a register driving shaft; means for magnetically transmitting power from the piston to said driving shaft comprising a fixed tube enclosing said shaft, a part fixed to said shaft, a driven roller member within said tube co-acting with said part, a driving magnet bar connected with the piston externally of said tube in contiguous relation to the wall thereof and disposed in substantially parallel relation to said driven roller member within the tube to produce a magnetic field synchronously moving with the piston in a closed path concentric to the tube and maintaining said driven roller member within said tube in rolling contact with the inner surface of the tube wall and in radially spaced relation from the driving shaft, and an armature member surrounding said tube in fixed relation thereto and in opposed relation to one end of said driving magnet bar to neutralize the weight of the piston and sustain the same in non-contacting relation to the walls of the measuring chamber.

CHARLES P. BERGMAN.

REFERENCES CITED

The following references are of record in the file of this patent:

UNITED STATES PATENTS

| Number | Name | Date |
| --- | --- | --- |
| 75,313 | Stein | Mar. 10, 1868 |
| 1,024,741 | Nash | Apr. 30, 1912 |
| 1,111,684 | Vaughan | Sept. 22, 1914 |
| 1,608,231 | Bradley | Nov. 23, 1926 |
| 1,614,530 | Lundquist | Jan. 18, 1927 |
| 1,724,873 | Ford | Aug. 13, 1929 |
| 1,805,021 | Somersgale et al. | May 12, 1931 |
| 1,862,267 | Honig | June 7, 1932 |
| 1,911,099 | White et al. | May 23, 1933 |
| 1,911,960 | Lipman | May 30, 1933 |
| 2,233,572 | Atkins | Mar. 4, 1941 |

FOREIGN PATENTS

| Number | Country | Date |
| --- | --- | --- |
| 624,654 | Germany | Jan. 25, 1936 |